United States Patent
Chen et al.

(10) Patent No.: US 7,342,798 B2
(45) Date of Patent: Mar. 11, 2008

(54) ELECTRONIC APPLIANCE AND ENCLOSURE THEREOF

(75) Inventors: Yun-Lung Chen, Tu-Cheng (TW); You-He Ke, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 468 days.

(21) Appl. No.: 10/977,812

(22) Filed: Oct. 29, 2004

(65) Prior Publication Data

US 2005/0264989 A1    Dec. 1, 2005

(30) Foreign Application Priority Data

May 28, 2004    (CN) ............. 2004 2 0046527 U

(51) Int. Cl.
G06F 1/16    (2006.01)
(52) U.S. Cl. ............... 361/724; 361/683; 312/223.2
(58) Field of Classification Search ........... 361/684, 361/683, 685, 724; 720/646, 647; 312/223.1, 312/223.2; 369/75.11, 77.2
See application file for complete search history.

(56) References Cited

U.S. PATENT DOCUMENTS

| | | | |
|---|---|---|---|
| 4,530,081 A * | 7/1985 | Sakurai et al. ............. 720/647 |
| 5,169,218 A * | 12/1992 | Chu ............................ 312/223.2 |
| 5,586,003 A | 12/1996 | Schmitt et al. |
| 5,820,235 A * | 10/1998 | Tsai ........................... 312/223.2 |
| 5,924,780 A * | 7/1999 | Ammon et al. ........... 312/223.2 |
| 5,924,782 A | 7/1999 | Park |
| 6,062,663 A * | 5/2000 | You et al. ................... 312/223.2 |
| 6,132,019 A * | 10/2000 | Kim et al. .................. 312/223.2 |
| 6,219,226 B1 * | 4/2001 | Bullington et al. .......... 361/683 |
| 6,324,147 B2 * | 11/2001 | Kanatani et al. ............. 720/647 |
| 6,654,251 B2 * | 11/2003 | Yun ............................ 361/724 |
| 6,711,008 B2 * | 3/2004 | Teng et al. .................. 361/683 |
| 7,055,160 B1 * | 5/2006 | Tan et al. .................... 720/647 |
| 2003/0184977 A1 * | 10/2003 | Jeon et al. ................... 361/724 |

* cited by examiner

*Primary Examiner*—Jayprakash Gandhi
*Assistant Examiner*—Anthony Q Edwards
(74) *Attorney, Agent, or Firm*—Tim Tingkang Xia, Esq.; Morris, Manning & Martin, LLP

(57) ABSTRACT

An electronic appliance includes an enclosure and an internal device (50). The enclosure includes a bezel (10) defining at least one opening (111). A pair of slanting slideways (151) is defined in the bezel. A bracket (20) is slidably attached to inside of the bezel to cover said opening. A pair of pivots (23) is formed on each end of the bracket, for being received in the slideways. A pair of slanting surface (211) is defined on the bracket. A pair of springs (30) connects between the bracket and the bezel. A tray (51) of the internal device is ejected out to push against the slanting surfaces of the bracket, the bracket is thereby moved to expose said opening, and the tray is extended through said opening. The springs drive the bracket to cover said opening after the tray is retracted in the internal device.

19 Claims, 4 Drawing Sheets

ELECTRONIC APPLIANCE AND ENCLOSURE THEREOF

BACKGROUND OF THE INVENTION

1. Field of the Invention

The present invention relates to an electronic appliance, and more particularly to an electronic appliance which includes an enclosure for protection from contamination and humidity.

2. Description of the Related Art

Varieties of electronic appliances, such as personal computers and digital video disc (DVD) players, has been widely spread in office and home use. These electronic appliances each comprise an enclosure for protection of internal devices thereof from contamination and humidity.

For example, a typical personal computer comprises an enclosure for protection of internal devices, such as hard disk drives, compact disk read-only memory (CD-ROM) drives, motherboard, and the like. To access the CD-ROM drive, an opening is defined in the enclosure. However, contamination and humidity often harm the personal computer via the opening.

To address aforementioned problem, an enclosure having a protective cover as described in China Patent No. 98220678.X is invented. The enclosure comprises a front panel defining an opening, and a cover is pivotably attached to the front panel via pivots for shielding the opening. However, the pivots are prone to be impaired due to wearing after repeated rotation.

SUMMARY OF THE INVENTION

Accordingly, an object of the present invention is to provide an enclosure which is suitable for protecting internal devices therein from contamination and humidity.

Another object of the present invention is to provide an electronic appliance which is protected from contamination and humidity.

To achieve the above objects, an electronic appliance in accordance with the present invention comprises an enclosure and an internal device. The enclosure comprises a bezel defining at least one opening, a bracket and a pair of resilient members. A pair of slanting slideways is defined in the bezel. The bracket is slidably attached to inside of the bezel to cover said opening. A pair of slanting surface is defined on the bracket. The resilient members connect between the bracket and the bezel. A tray of the internal device is ejected out to push against the slanting surfaces of the bracket, the bracket is thus moved along the slideways to expose said opening, thereby the tray is extended through said opening. The resilient members drive the bracket back to cover said opening after the tray is retracted in the internal device.

Other objects, advantages and novel features of the present invention will be drawn from the following detailed description of a preferred embodiment of the present invention with the attached drawings, in which:

DETAILED DESCRIPTION OF THE PRESENT INVENTION

Figure 1:
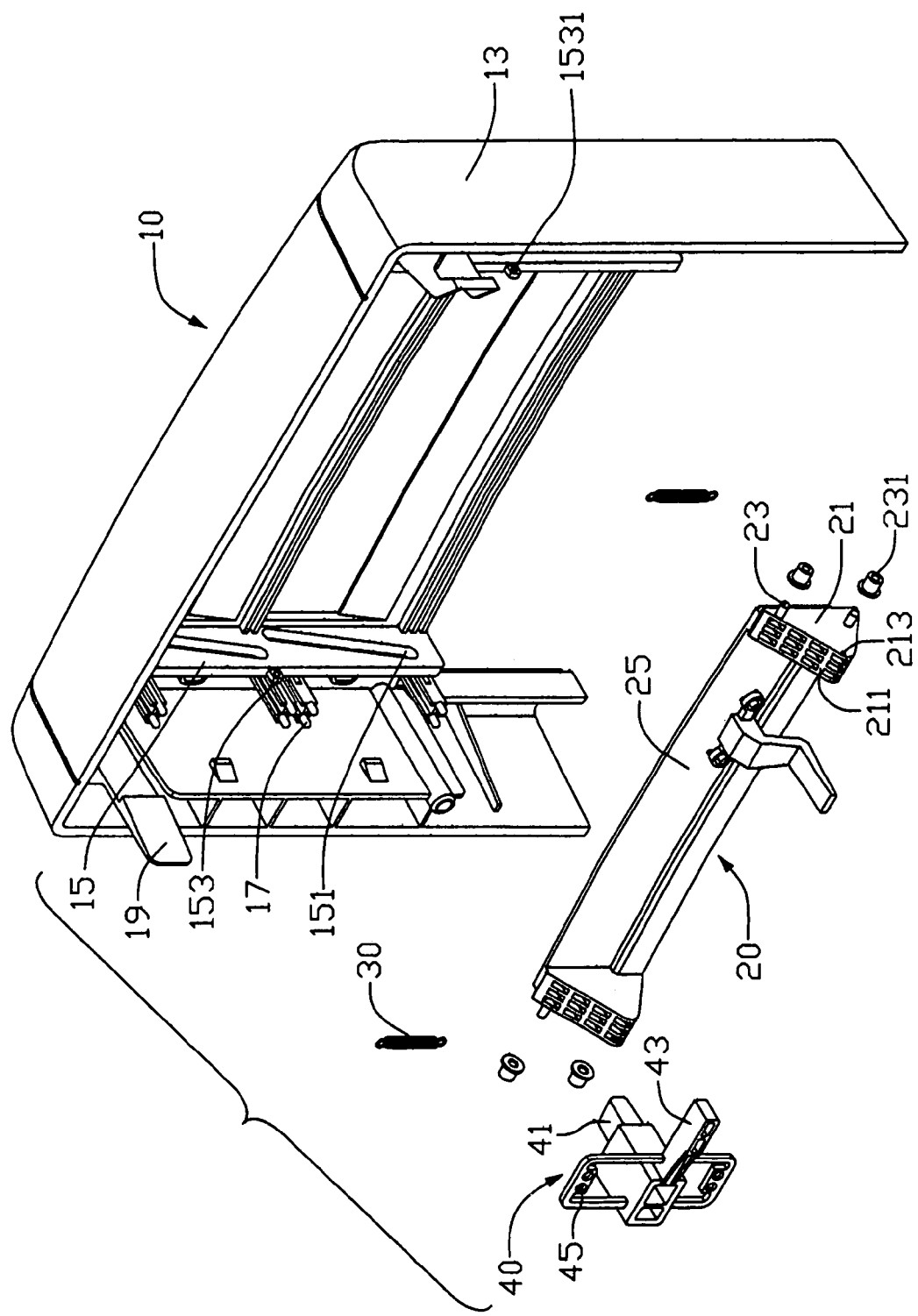
FIG. 1 is an exploded, isometric view of an enclosure in accordance with a preferred embodiment of the present invention, the enclosure comprising a bezel, a bracket, a pair of springs and a button.
Figure 3:
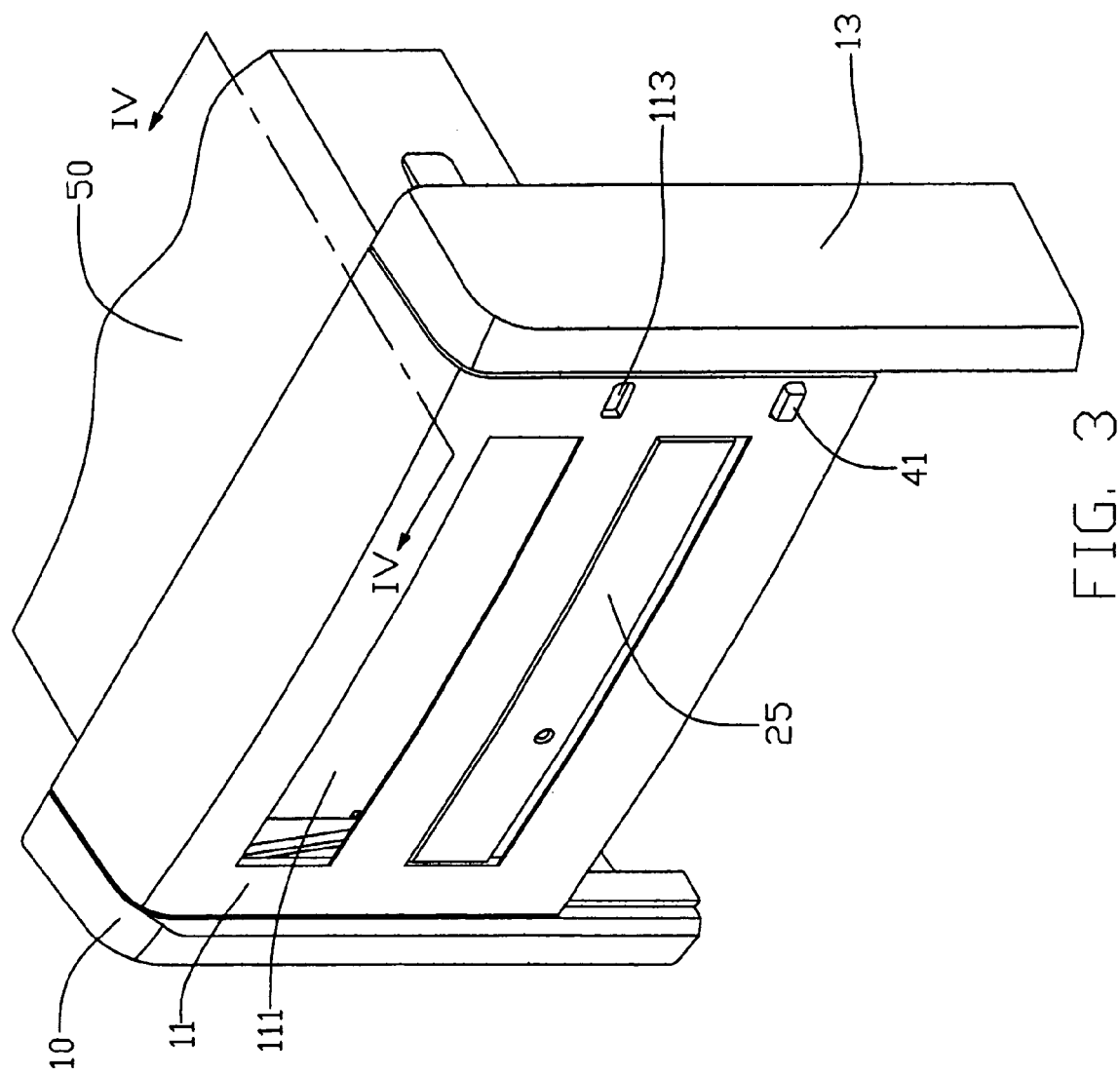
FIG. 3 is an isometric view of the assembled enclosure together with an internal device.

Referring to FIGS. 1 and 3, an enclosure for electronic appliance in accordance with a preferred embodiment of the present invention comprises a bezel 10, a bracket 20 and a button 40. The enclosure further comprises a plurality of walls (not shown) defining an internal space to accommodate varieties of internal devices.

The bezel 10 comprises a front surface 11 and a pair of side surfaces 13 extending rearward from side edges of the front surface 11 respectively. Two vertically spaced openings 111 are defined in the front surface 11. Two button holes 113 are defined in the front surface 11 adjacent to the openings 111 respectively. A pair of vertical plates 15 is formed on internal side of the front surface 11 abutting opposite ends of the openings 111 respectively. A pair of slanting slideways 151 is defined in each vertical plate 15, corresponding to the openings 111. Each slideway 151 has its upper end defined closer to the inside side of the front surface 11 than lower end thereof did. A tab 153 is protruded inwardly from middle portion of each vertical plate 15, and a through-hole 1531 is defined in the tab 153. A plurality of retention posts 17 is formed on the internal side of the front surface 11 adjacent to each button hole 113, for mounting corresponding button 40 to the bezel 10. A pair of fixing pieces 19 is formed for connecting the bezel 10 to the walls thereby forming the enclosure.

The bracket 20 comprises a connecting plate 25, and two protrusions 21 disposed at opposite ends of the connecting plate 25 respectively. The connecting plate 25 is designated to shield corresponding opening 111 of the bezel 10. Each protrusion 21 defines a triangle cross-section. A slanting surface 211 is formed on each protrusion 21. An aperture 213 is defined in an apex of each protrusion 21 farmost to the connecting plate 25. A pair of pivots 23 is projected outward from side surface of each protrusion 21. Two pairs of bushings 231 are provided to mate with corresponding pivots 23.

A pair of resilient members such as springs 30 is provided to connect between the bracket 20 and the bezel 10.

The button 40 comprises a first end 41 and a second end 43. A plurality of holes 45 is defined in the button 40, corresponding to the retention posts 17 of the bezel 10.

Figure 2:
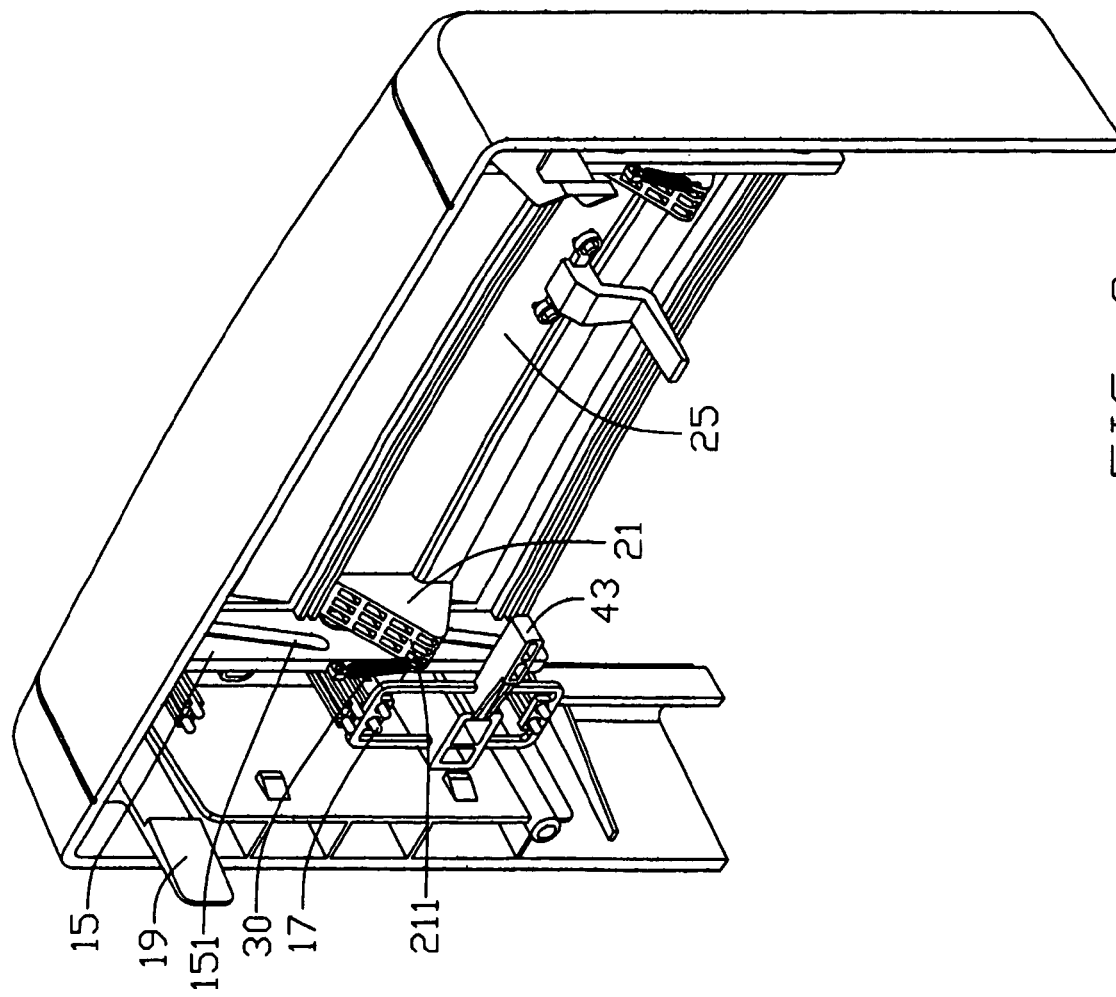
FIG. 2 is an assembled view of FIG. 1.

In assembly of the enclosure, the bushings 231 are attached to the pivots 23 of the bracket 20. The bracket 20 is slidably attached to the bezel 10 with pivots 23 received in the slideways 151 of the bezel 10 respectively. Each spring 30 has its opposite ends respectively engaged in corresponding through-hole 1531 of the bezel 10 and corresponding aperture 213 of the bracket 20 respectively. The button 40 is attached to the bezel 10, with retention posts 17 of the bezel 10 engaging in corresponding holes 45 of the button 40. The first end 41 of the button 40 is exposed outside the front surface 11 of the bezel 10 through the button hole 113. The assembled enclosure is shown in FIGS. 2 and 3.

Figure 4:
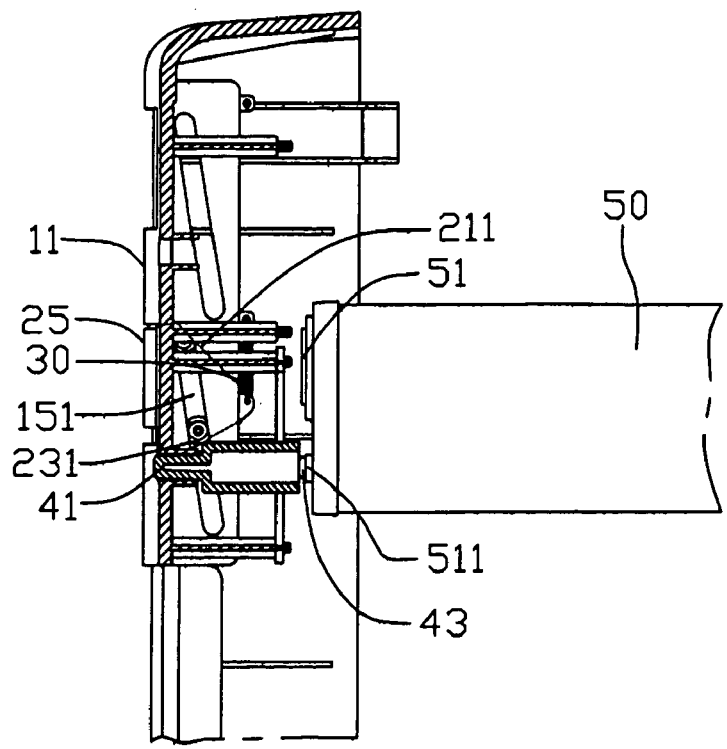
FIGS. 4 and 5 are cross-sectional views of FIG. 3 taken along line IV-IV thereof, showing the internal device in different states respectively.
Figure 5:
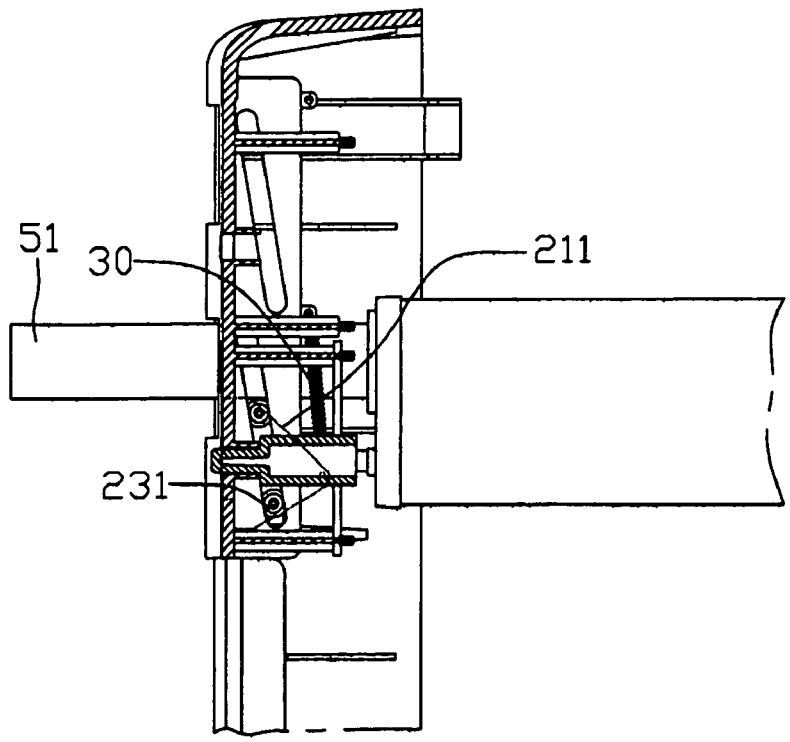

Referring to FIGS. 4 and 5, an internal device 50 is received in the enclosure, the internal device 50 comprising a movable tray 51. The internal device 50 can be a compact disc read-only memory (CD-ROMs) drive, a digital video disc (DVD) drive, and the like. A button 511 is formed on the internal device 50 to control movement of the tray 51. As shown in FIG. 4, the tray 51 is fully received in the internal device 50, the button 511 is located behind the second end 43 of the button 40, and the connecting plate 25 of the bracket 20 fully covers corresponding opening 111 of the bezel 10.

To use the internal device 50, the first end 41 of the button 40 is pressed inwardly, the second end 43 is moved rearward to push the button 511 of the internal device 50, and the button 511 activates the internal device 50 to eject the tray 51 out. The tray 51 is extended forwardly toward corresponding opening 111 of the bezel 10. The tray 51 presses against the slanting surfaces 211 of the protrusions 211 of the bracket 20, and the bracket 20 is forced to move downwardly along the slideways 151 to expose corresponding opening 111 of the bezel 10. The tray 51 is extended through corresponding opening 111, the bracket 20 stops at the lower ends of the slideways 151 of the bezel 10, and the springs 30 are stretched out respectively (see FIG. 5).

To retract the tray 51 into the internal device 50, the button 40 is pushed to drive the button 511, and the internal device 50 is activated to retract the tray 51. The springs 30 restore to drive the bracket 20 upwardly to an original position shown in FIG. 4 along the slideways 151 of the bezel 10, and the connecting plate 25 of the bracket 20 fully covers corresponding opening 111.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. An enclosure for an electronic appliance, comprising:
a bezel defining at least one opening;
a bracket slidably attached to inside of the bezel to cover said opening; and
a pair of resilient members attached to the bracket at one end and the bezel at the other end;
wherein a force is applied to the bracket to move the bracket to expose said opening, and the resilient members drive the bracket back to cover said opening after the force is removed.

2. The enclosure as claimed in claim 1, wherein a pair of slideways is defined in the bezel abutting opposite ends of said opening respectively, and the bracket comprises at least two pivots received in the slideways respectively.

3. The enclosure as claimed in claim 2, wherein the bracket defines a pair of slanting surfaces, each of the slideways is slanting with upper end thereof closer to said opening than lower end thereof, and the force is applied to the slanting surfaces.

4. The enclosure as claimed in claim 3, wherein the bracket comprises a plate to cover said opening.

5. The enclosure as claimed in claim 4, wherein a pair of protrusions is formed on opposite ends of the plate, and the slanting surfaces is defined on the protrusions respectively.

6. The enclosure as claimed in claim 1, wherein at least one button hole is defined in the bezel, and a button is attached to the inside of the bezel with an end extended through said button hole.

7. The enclosure as claimed in claim 1, wherein the resilient members are springs respectively.

8. An electronic appliance comprising:
a bezel defining at least one opening;
a bracket slidably attached to the bezel, the bracket comprising a plate shielding said opening; and
an internal device comprising an ejectable tray in alignment with said opening;
wherein the tray of the internal device is ejected out to push the bracket to expose said opening and is extended through said opening wherein a pair of opposite plates is formed abutting opposite ends of said opening respectively, and a pair of slanting slideways is defined in the plates of the bezel respectively.

9. The electronic appliance as claimed in claim 8, further comprising a pair of resilient members attached to the bracket at one end and the bezel at the other end.

10. The electronic appliance as claimed in claim 9, wherein the resilient members are adapted to urge the bracket to shield said opening when the tray is retracted in the internal device from said opening.

11. The electronic appliance as claimed in claim 10, wherein each of the resilient members is a spring.

12. The electronic appliance as claimed in claim 8, wherein the bracket comprise at least two pivots received in the slideways of the plates of the bezel respectively.

13. The electronic appliance as claimed in claim 12, wherein the bracket further comprises a pair of protrusions on opposite ends of the plate, and each of the protrusions defines a slanting surface adapted to engage the tray of the internal device.

14. The electronic appliance as claimed in claim 12, further comprising a button having a first end for being manipulated and a second end to activate the tray of the internal device.

15. The electronic appliance as claimed in claim 12, wherein at least two bushings are provided to mate with the pivots of the bracket respectively.

16. A method for an enclosure of an electronic appliance to expose an internal device of said electronic appliance shielded by said enclosure, comprising the steps of:
providing an opening on said enclosure for exposure of a slidable tray of said internal device therefrom;
providing a bracket attached to said enclosure next to said internal device, and movable from a first position of fully shielding said opening from exposing said internal device and a second position of allowing said exposure of said internal device; and
moving said bracket from said first position thereof to said second position thereof without rotation of said bracket when said tray of said internal device slides out of said enclosure.

17. The method as claimed in claim 16, further comprising the step of moving said bracket from said second position thereof to said first position thereof without rotation of said bracket in case of non-necessity of said exposure of said internal device.

18. The method as claimed in claim 16, wherein said bracket moves linearly along at least one linear slideway in said moving step.

19. The method as claimed in claim 16, wherein said bracket is moved due to abutment of an exposable portion of said internal device against a slanting surface of said bracket.

* * * * *